(12) United States Patent
Kwak et al.

(10) Patent No.: US 11,349,173 B2
(45) Date of Patent: May 31, 2022

(54) BATTERY MODULE, BATTERY PACK COMPRISING THE BATTERY MODULE AND VEHICLE COMPRISING THE BATTERY PACK

(71) Applicant: LG Chem, Ltd., Seoul (KR)

(72) Inventors: Jung-Min Kwak, Daejeon (KR); Jong-Ha Jeong, Daejeon (KR); Do-Hyun Park, Daejeon (KR); Young-Ho Lee, Daejeon (KR); Yong-Hoon Lee, Daejeon (KR)

(73) Assignee: LG Energy Solution, Ltd.

( * ) Notice: Subject to any disclaimer, the term of this patent is extended or adjusted under 35 U.S.C. 154(b) by 236 days.

(21) Appl. No.: 16/723,229

(22) Filed: Dec. 20, 2019

(65) Prior Publication Data

US 2020/0243817 A1    Jul. 30, 2020

(30) Foreign Application Priority Data

Dec. 26, 2018   (KR) .......................... 10-2018-0169945

(51) Int. Cl.
*H01M 50/20* (2021.01)
*H01M 50/24* (2021.01)
*H01M 50/502* (2021.01)

(52) U.S. Cl.
CPC .......... *H01M 50/20* (2021.01); *H01M 50/24* (2021.01); *H01M 50/502* (2021.01); *H01M 2220/20* (2013.01)

(58) Field of Classification Search
CPC .... H01M 50/20; H01M 50/24; H01M 50/502; H01M 2220/20; H01M 50/116; H01M 50/531; Y02E 60/10; B29C 65/52; B29L 2031/3468
See application file for complete search history.

(56) References Cited

U.S. PATENT DOCUMENTS

| 2016/0149175 | A1* | 5/2016 | Morimitsu | ............ H01M 50/20 |
| | | | | 429/156 |
| 2016/0197386 | A1* | 7/2016 | Moon | .................... H01M 50/20 |
| | | | | 429/120 |
| 2017/0077562 | A1* | 3/2017 | Park | .................... H01M 10/425 |
| 2018/0040863 | A1* | 2/2018 | Kim | ...................... H01M 50/20 |
| 2018/0048033 | A1* | 2/2018 | Lee | ................... H01M 10/6551 |

(Continued)

FOREIGN PATENT DOCUMENTS

| KR | 20060134549 A | 12/2006 |
| KR | 20150025236 A | 3/2015 |

(Continued)

*Primary Examiner* — Michael L Dignan
(74) *Attorney, Agent, or Firm* — Lerner, David, Littenberg, Krumholz & Mentlik, LLP

(57) ABSTRACT

A battery module includes a cell stack structure formed as a plurality of battery cells stacked and accommodated in a module case. The module case includes at least one hole forming plate having a plurality of resin injection holes formed therein for receiving an adhesive resin therethrough, and the plurality of resin injection holes are distributed on both a left side and a right side of a center of the hole forming plate in a longitudinal direction thereof, such that the resin injection holes on the left side and the right side are spaced apart from each other by a predetermined distance from the center of the hole forming plate in the longitudinal dimension.

17 Claims, 10 Drawing Sheets

(56) References Cited

U.S. PATENT DOCUMENTS

2018/0076493 A1* 3/2018 Park .................... H01M 10/653
2018/0194235 A1* 7/2018 Kim .................... H01M 50/502
2019/0051954 A1   2/2019 Kim et al.

FOREIGN PATENT DOCUMENTS

| KR | 20160105354 A   |   | 9/2016  |               |
|----|-----------------|---|---------|---------------|
| KR | 20180071800 A   |   | 6/2018  |               |
| KR | 20180084539 A   |   | 7/2018  |               |
| WO | WO2016137303    | * | 9/2016  | ... H01M 2/02 |
| WO | WO2016175590    | * | 11/2016 | ... H01M 2/10 |
| WO | WO2017150807    | * | 9/2017  | ... H01M 2/10 |

* cited by examiner

BATTERY MODULE, BATTERY PACK COMPRISING THE BATTERY MODULE AND VEHICLE COMPRISING THE BATTERY PACK

CROSS-REFERENCE TO RELATED APPLICATIONS

The present application claims priority from Korean Patent Application No. 10-2018-0169945 filed on Dec. 26, 2018, the disclosure of which is incorporated herein by reference.

TECHNICAL FIELD

The present disclosure relates to a battery module, and a battery pack and vehicle including the battery module, and more particularly, to a battery module capable of easily checking resin injection and a distribution state after injection, and removing an internal gas during adhesive resin injection into the battery module, as well as a battery pack and vehicle including the battery module.

BACKGROUND ART

Secondary batteries are getting the limelight as a power source of electric vehicles or hybrid electric vehicles (HEV) in that secondary batteries are an environmental friendly energy source that replaces fossil fuel.

Types of the secondary battery currently widely used include a lithium ion battery, a lithium polymer battery, a nickel cadmium battery, a nickel hydrogen battery, a nickel zinc battery, and the like. Because an operation voltage of a unit secondary battery cell, i.e., a unit battery cell, is only about 2.5 V to 4.5 V, a plurality of battery cells are connected in series to construct a battery module of a high output voltage, such battery modules are connected again in series and/or in parallel to construct a high output and high capacity battery pack, and the battery pack is mounted on a vehicle body or trunk space of an electric vehicle.

Because the battery module/pack for an electric vehicle is generally installed in a limited space as described above, the battery module/pack needs to have small volume as much as possible, have very high energy density, and maintain structural stability even in an environment with continual vibration and impacts.

A pouch type battery cell that is easily stacked while constructing such a battery module for an electric vehicle and has high energy density compared to volume has recently been used extensively. For example, the battery module is compactly manufactured by stacking the pouch type battery cells in one direction to create a cell stack structure, accommodating the cell stack structure in a module case slimly manufactured in an angled tubular shape called a mono frame, and injecting adhesive resin into the module case to fix the cell stack structure in the module case.

FIG. 1 is a bottom plan view of a battery module according to the related art.

As shown in FIG. 1, the battery module includes injection holes 2 at a center portion of a module case 1 for adhesive resin injection. Adhesive resin may be injected into the module case 1 through the injection holes 2 to be filled in an empty space between an inner surface of the module case 1 and a bottom surface of a cell stack structure (side portions of battery cells). The battery cells may have satisfactory heat dissipation and fixability with respect to the module case 1 by such adhesive resin.

Meanwhile, in the case of an electric vehicle, a place where a battery module is mountable mostly has a better degree of horizontal space freedom than a degree of vertical space freedom. In this regard, the length of battery cells is gradually increased and the width thereof is being relatively decreased to increase the capacity of the battery module.

However, when a battery module is configured of battery cells having long lengths compared to their widths, there is a difficulty in injecting the adhesive resin. In other words, in the battery cells having relatively short lengths as shown in FIG. 1, adhesive resin can be distributed up to both edge regions even when injection holes of conventional shapes are used, but in the case of a long cell, it is not easy to uniformly distribute adhesive resin to ends of both edge regions because the distances from a center to both edge regions are long.

Also, conventionally, it is difficult to determine when to stop injection because an internal state of a module case is unknown during injection of adhesive resin, and it is a hassle to run a computerized tomography (CT) scan to check the internal state. In addition, because a conventional module case is not provided with a passage through which air can be externally extracted, bubbles may be generated in the adhesive resin, thereby adversely affecting fixability and heat dissipation performance of battery cells.

DISCLOSURE

Technical Problem

The present disclosure is designed in consideration of the above problems, and in particular, enables adhesive resin to be smoothly distributed up to a required space in a battery module employing a long cell.

Also, the present disclosure increases filling density of adhesive resin by enabling a distribution state of the adhesive resin to be easily checked with naked eyes and air inside a module case to be externally discharged during an adhesive resin injection process, thereby increasing fixability and heat dissipation of battery cells.

However, the technical problems to be solved by the present disclosure are not limited thereto, and other unmentioned objects will become apparent to one of ordinary skill in the art from the description of the present disclosure below.

Technical Solution

In one aspect of the present disclosure, there is provided a battery module including a cell stack structure formed as a plurality of stacked battery cells and a module case accommodating the cell stack structure, and capable of injecting adhesive resin into the module case from the outside of the module case, wherein the module case includes at least one hole forming plate where a plurality of resin injection holes into which the adhesive resin is injected are formed, and wherein the plurality of resin injection holes are each distributed on a left side and a right side spaced apart from each other by a predetermined distance from a center of the hole forming plate in a length direction.

The plurality of resin injection holes may include first injection holes arranged in one column on the left side along a width direction of the hole forming plate, and second injection holes arranged in one column on the right side along the width direction of the hole forming plate, wherein the first injection holes and the second injection holes may be symmetrically provided based on the center of the hole forming plate.

The battery module may further include a plurality of resin checking holes formed at locations spaced apart from the first injection holes and the second injection holes by a predetermined distance on the hole forming plate.

The plurality of resin checking holes may include: first checking holes provided between the first injection holes and the second injection holes; second checking holes provided at a left edge region of the hole forming plate; and third checking holes provided at a right edge region of the hole forming plate.

The plurality of resin injection holes may be formed such that their diameters are decreased from an outer surface to an inner surface of the hole forming plate, and the plurality of resin checking holes may be formed such that their diameters are decreased from the inner surface to the outer surface of the hole forming plate.

The battery module may further include a bus bar frame assembly including a plurality of bus bars supporting the cell stack structure, slidingly inserted into the module case together with the cell stack structure, and electrically connected to electrode leads of the plurality of battery cells.

A top portion, a front portion, and a rear portion of the cell stack structure may be covered by the bus bar frame assembly, and a bottom portion of the cell stack structure may be covered by the adhesive resin.

The battery cells may be a pouch type secondary battery including a pair of electrode leads extending in opposite directions along a length direction of the battery cells, wherein the pair of electrode leads may be formed at a location biased downward from a center portion of the cell stack structure in a height direction.

In another aspect of the present disclosure, there is provided a battery pack including the one or more battery modules described above.

In another aspect of the present disclosure, there is provided a vehicle including the battery pack as a power source. The vehicle may include an electric vehicle (EV) or a hybrid electric vehicle (HEV).

Advantageous Effects

According to an aspect of the present disclosure, fixability and cooling performance of battery cells may be improved because adhesive resin can be smoothly filled up to a required place in a battery module employing a long cell.

According to another aspect of the present disclosure, a battery module can be more compact than existing ones because components constituting the battery module are space-efficiently assembled.

MODE FOR DISCLOSURE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustration only, not intended to limit the scope of the disclosure, so it should be understood that other equivalents and modifications could be made thereto without departing from the scope of the disclosure.

Figure 2:
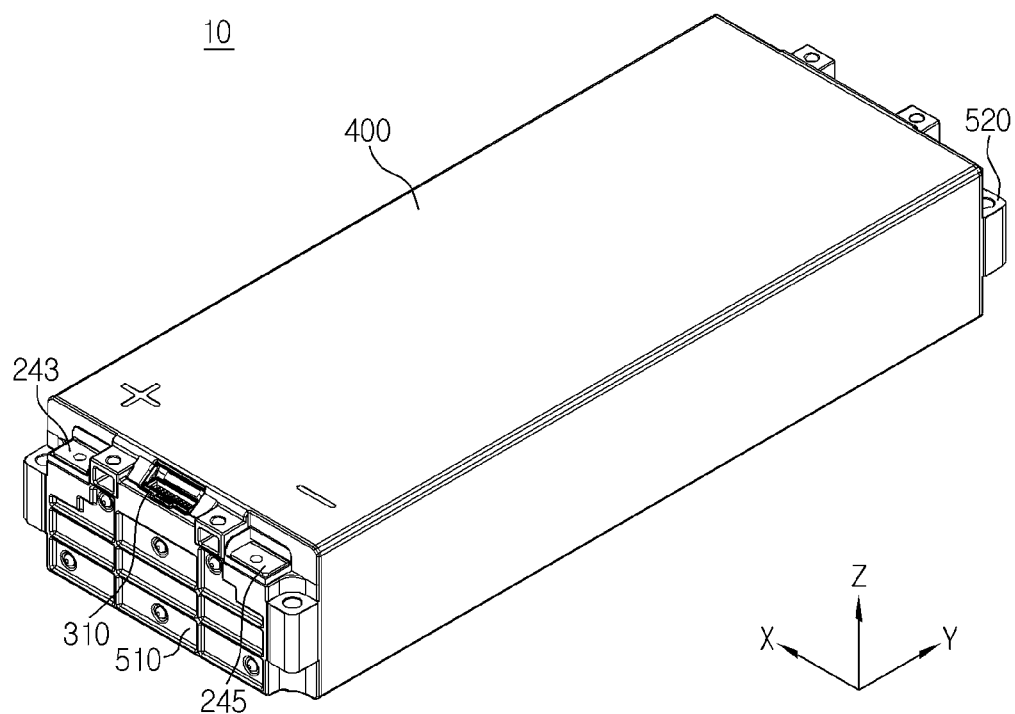
FIG. 2 is a perspective view of a battery module according to an embodiment of the present disclosure.
Figure 3:
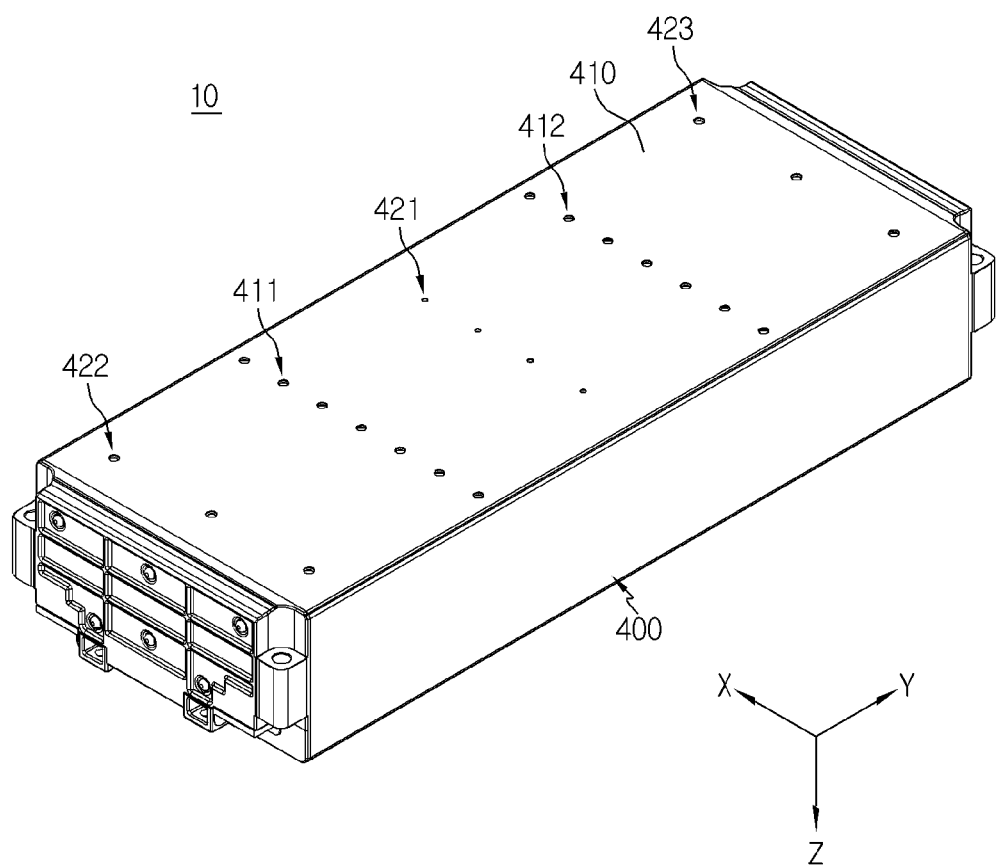
FIG. 3 is a perspective view of the battery module of FIG. 2, wherein a bottom surface of the battery module faces upward.
Figure 4:
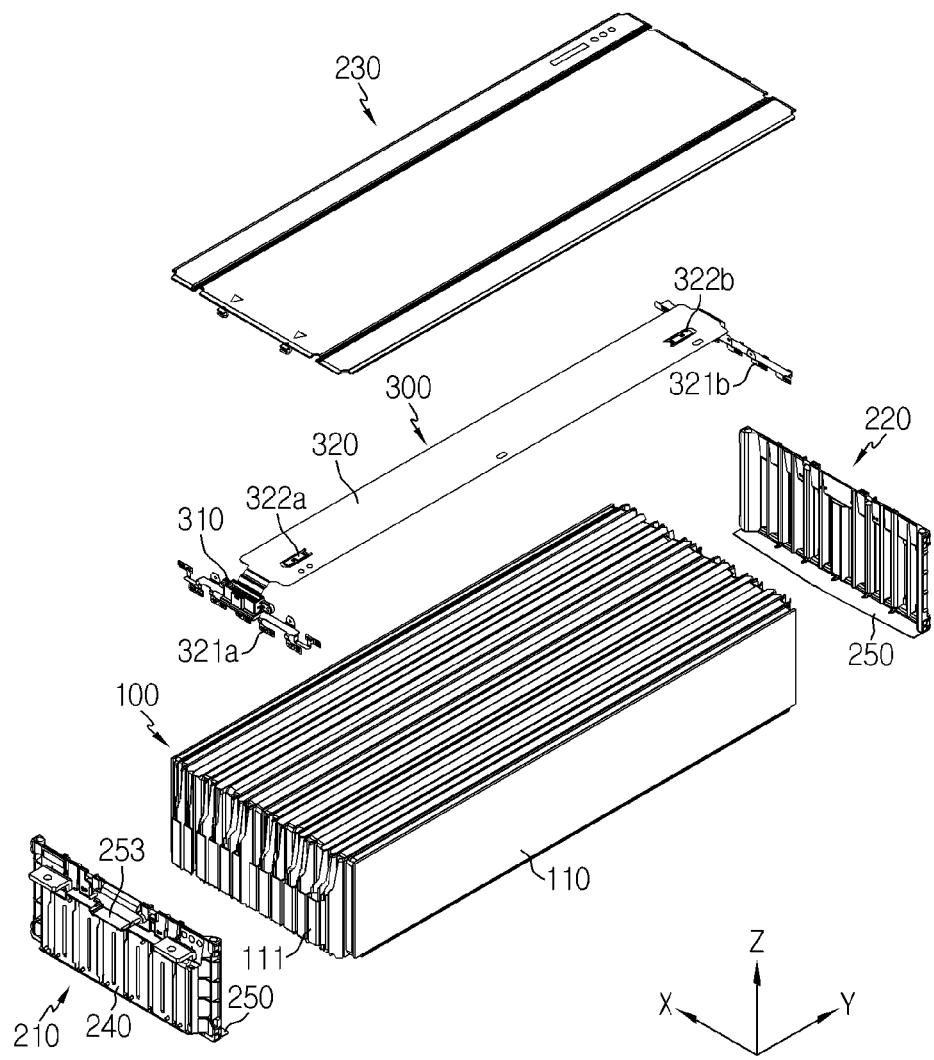
FIG. 4 is an exploded perspective view of a cell stack structure and a bus bar frame assembly, according to an embodiment of the present disclosure.

FIG. 2 is a perspective view of a battery module according to an embodiment of the present disclosure, FIG. 3 is a perspective view of the battery module of FIG. 2, wherein a bottom surface of the battery module faces upward, and FIG. 4 is an exploded perspective view of a cell stack structure and a bus bar frame assembly, according to an embodiment of the present disclosure.

Referring to the drawings, a battery module 10 according to the current embodiment includes a cell stack structure 100, a bus bar frame assembly 200, a voltage sensing member 300, and a module case 400 accommodating them inside as shown in FIG. 2.

As will be described in detail below, in the current embodiment, because a plurality of resin injection holes (into which adhesive resin L is injected from the outside to the inside of the module case 400) are provided on a bottom surface of the module case 400 in two columns at the left and right of the center, the adhesive resin L may be easily filled up to a bottom surface edge region of battery cells 110 therethrough.

A material having excellent adhesive property and thermal conductivity is used as the adhesive resin L. The battery cells 110 are fixed inside the module case 400 via the adhesive resin L and heat may be radiated to the outside of the module case 400 during charging and discharging. For example, the battery module 10 may be cooled down as the bottom surface of the module case 400 is placed on a top surface of a heat sink (not shown).

First referring to the cell stack structure 100 among the components forming such a battery module 10, the cell stack structure 100 may be an assembly of the battery cells 110 formed by stacking the plurality of battery cells 110. Here, the battery cell 110 may be a pouch type secondary battery.

The pouch type secondary battery may include an electrode assembly, an electrolyte solution, and a pouch exterior material. The pouch exterior material may include two pouches, and at least one thereof may have a concave internal space. The electrode assembly and the electrolyte solution may be accommodated in the internal space of the pouch exterior material. Sealing portions may be provided on outer circumferential surfaces of the two pouches and fused to each other, thereby sealing the internal space where the electrode assembly is accommodated.

An electrode lead 111 may be attached to the electrode assembly and such an electrode lead 111 may be disposed between the sealing portions of the pouch exterior material and exposed to the outside of the pouch exterior material to function as an electrode terminal of the secondary battery.

Figure 5:
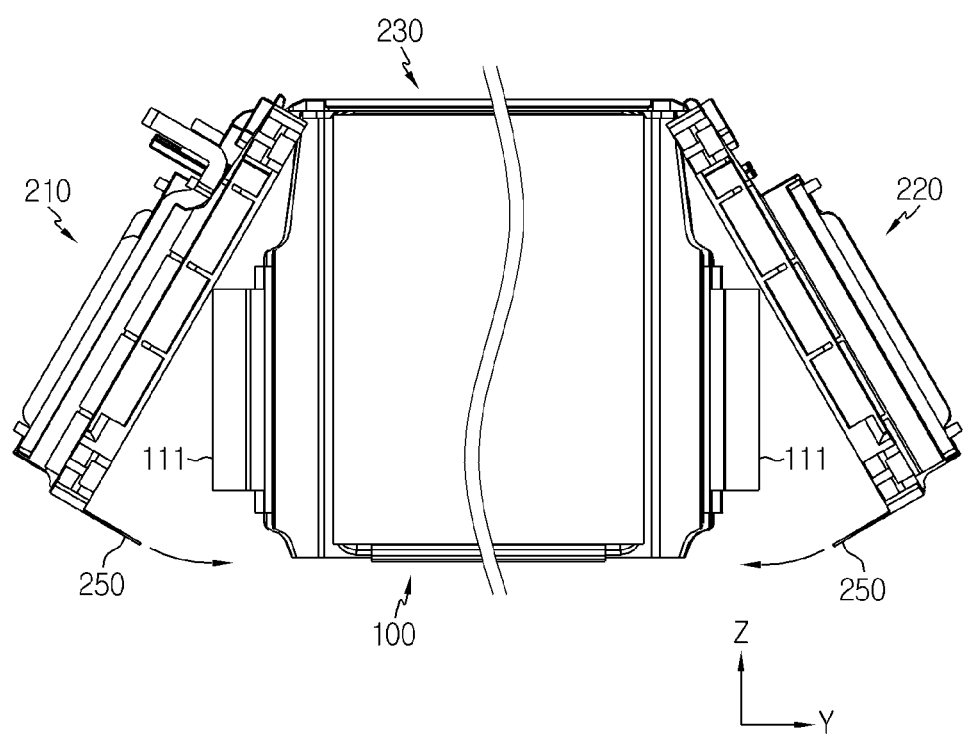
FIG. 5 is an assembly process diagram of a cell stack structure and a bus bar frame assembly, according to an embodiment of the present disclosure.

The battery cell 110 according to the current embodiment is the pouch type secondary battery having the pair of electrode leads 111 extending in opposite directions along a length direction of the battery cell 110, and in particular, the pair of electrode leads 111 are biased to one side from a center portion of the battery cell 110 in a width direction. In other words, as shown in FIGS. 4 and 5, the pair of electrode leads 111 are biased to one side from the center portion of the battery cell 110 in the width direction (Z-axis direction) and biased downward along a height direction (Z-axis direction) of the cell stack structure 100.

As such, by forming the cell stack structure 100 using the battery cells 110 in which the pair of electrode leads 111 are biased to one side from the center portion of the battery cell 110 in the width direction, utility of assembly space in the battery module 10 may become satisfactory. For example, there may be sufficient space to install a connector member 310, external terminals 243 and 245, and other components in an upper region (see FIG. 6) of the electrode leads 111.

Meanwhile, the battery cell 110 of the present disclosure is a long cell having a relatively long length compared to the width of existing battery cells 110, and a ratio of the width to the length may be about 1:4 to 1:5. Such a long cell type battery cell 110 is employed to maintain the height of the battery module 10 low while increasing capacity of the battery, thereby making it easier to install the high capacity battery module 10 in a location such as a lower portion of a seat or trunk of a vehicle. However, the scope of the present disclosure is not limited thereto.

The bus bar frame assembly 200 includes a front frame 210, a rear frame 220, and a top frame 230 to support the cell stack structure 100. The front frame 210, the rear frame 220, and the top frame 230 have sizes respectively corresponding to a front portion, a rear portion, and a top portion of the cell stack structure 100 to cover corresponding regions.

Figure 6:
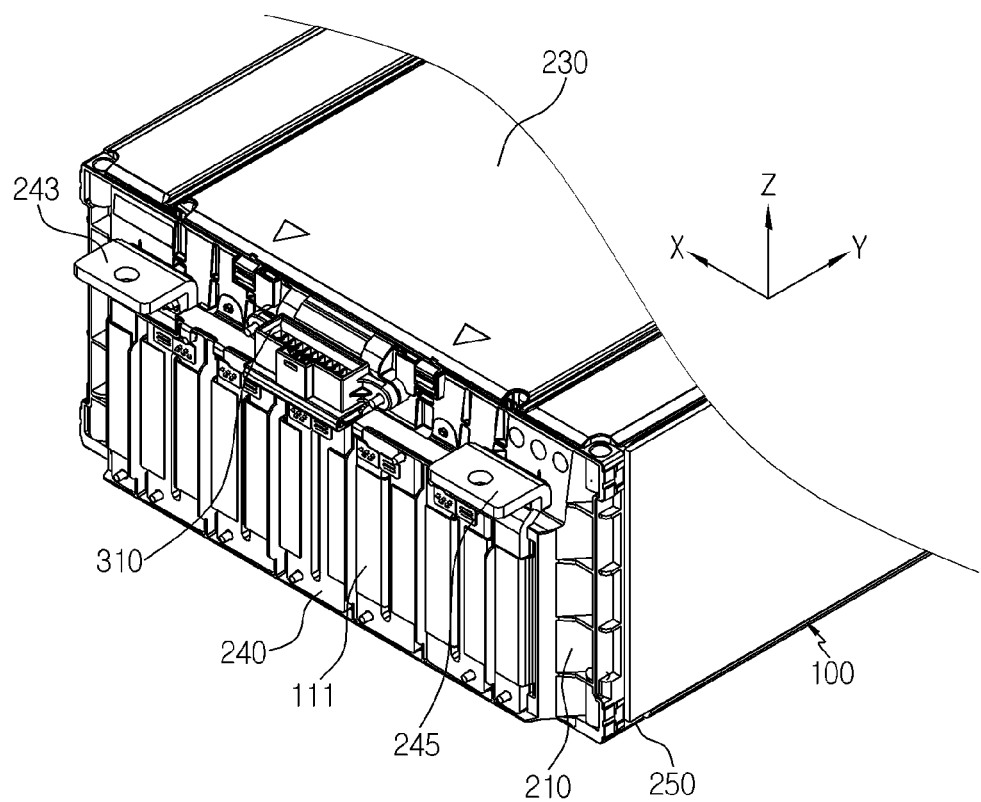
FIG. 6 is a perspective view showing a front portion of a cell stack structure after an assembly process of FIG. 5.

An assembly process of the cell stack structure 100 and the bus bar frame assembly 200 will be briefly described with reference to FIGS. 5 and 6.

First, the bus bar frame assembly 200 is overlaid on the cell stack structure 100 or the bus bar frame assembly 200 is placed at the bottom and the cell stack structure 100 is mounted thereon, and then the front frame 210 and the rear frame 220 are rotated such that the electrode leads 111 of each battery cell 110 pass through and are extracted from slits formed on the front frame 210 and the rear frame 220, and the front frame 210 and the rear frame 220 are perpendicularly arranged respectively at the front portion and the rear portion of the cell stack structure 100.

Next, when the battery cells 110 are all connected in series and/or in parallel by folding the electrode leads 111 of the battery cells 110 and welding the electrode leads 111 while in contact with surfaces of corresponding bus bars 240, the assembling of the cell stack structure 100 and the bus bar frame assembly 200 is completed.

The front frame 210 and the rear frame 220 may further include support plates 250 at bottom portions. The support plates 250 are arranged below a bottom surface of the cell stack structure 100 to support both end regions of a bottom portion of the cell stack structure 100. Such a support plate 250 may prevent sagging of the cell stack structure 100 and facilitate assembly with the module case 400.

As shown in FIG. 4, the voltage sensing member 300 may be embodied as a flexible printed circuit board (FPCB) 320 including sensing terminals 321 at both end portions. The FPCB 320 has excellent insulation, heat resistance, and flexibility, and thus may contribute to simplifying a wiring structure of the battery module 10.

The FPCB 320 may be attached to a bottom surface of the top frame 230 and arranged on a top surface of the cell stack structure 100 along a length direction of the cell stack structure 100. Sensing terminals 321a and 321b are respectively attached to the bus bars 240 of the front frame 210 and rear frame 220, and detect voltages at corresponding locations. Voltage signals collected by the sensing terminals 321a and 321b may be transmitted to a battery management system (BMS) via the connector member 310 integrally combined to the FPCB 320.

Also, the FPCB 320 may further include temperature sensors 322a and 322b. Generally, in the battery cell 110, because a temperature around the electrode leads 111 is the highest, the temperature sensors 322a and 322b may be located at both edges of the cell stack structure 100. Temperature data detected by the temperature sensors 322a and 322b may be transmitted to the BMS through the FPCB 320 and the connector member 310 like voltage data.

Figure 7:
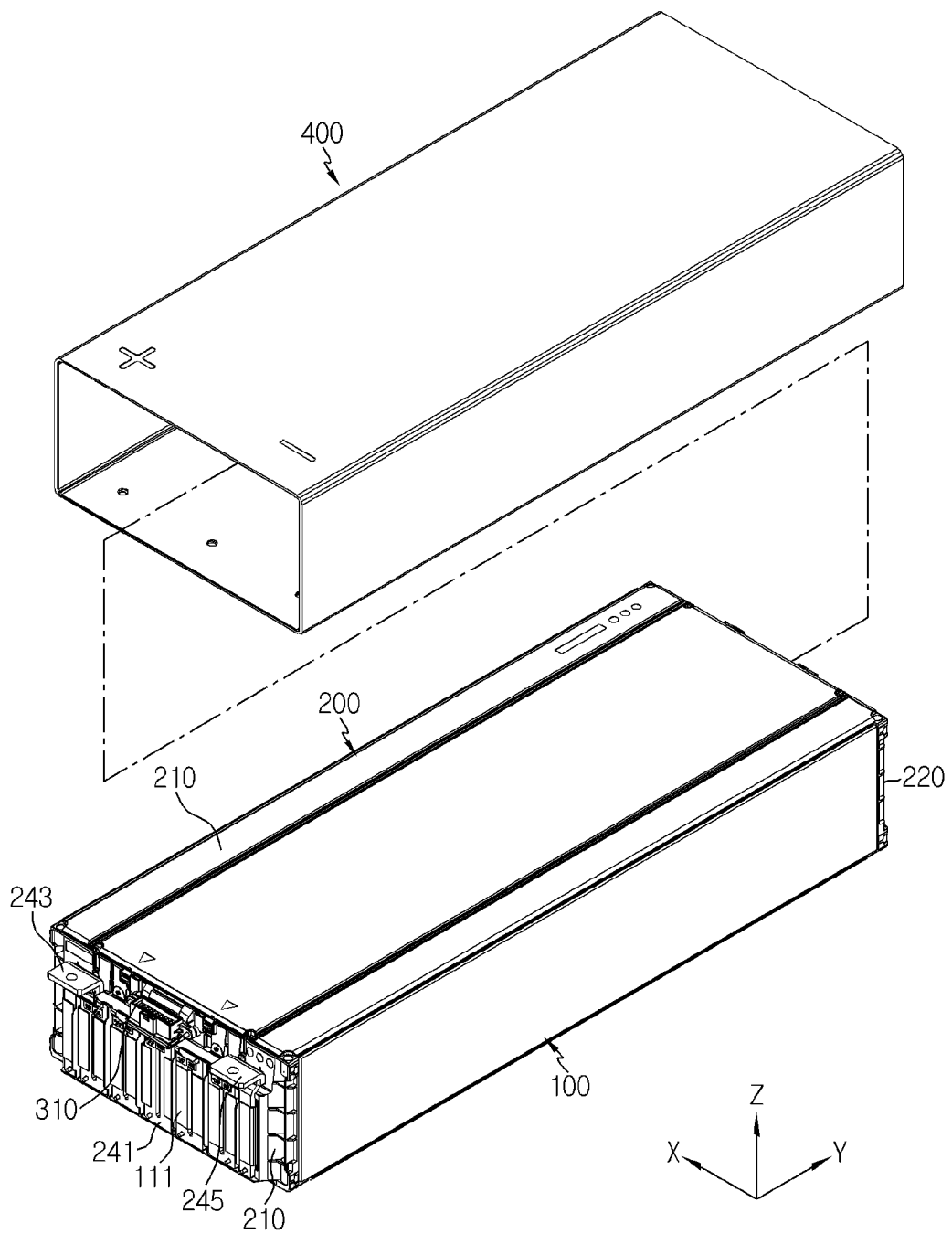
FIGS. 7 and 8 are assembly process diagrams of a cell stack structure and a module case, according to an embodiment of the present disclosure.

As shown in FIG. 7, the module case 400 may be realized in a rectangular tube shape having an internal space corresponding to the volume of the cell stack structure 100. The module case 400 may be manufactured in a metal material having satisfactory mechanical stiffness and thermal conductivity to protect the cell stack structure 100 from an external impact or the like and to dissipate heat of the cell stack structure 100 to the outside.

Figure 8:
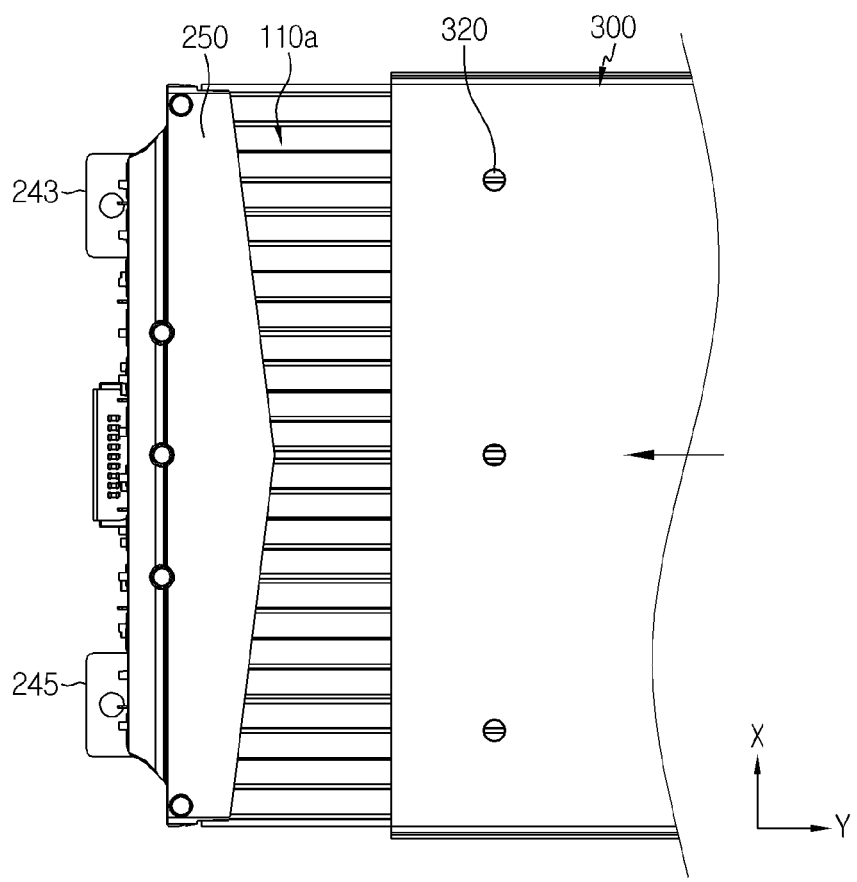

External exposure of the bus bar 240 and the like is prevented by integrally inserting the cell stack structure 100 into such a module case 400 as shown in FIG. 8 via a sliding or fitting method, and shielding both sides of an open portion of the module case 400 with an insulating cover and module covers 510 and 520. Then, the adhesive resin L is injected into the module case 400 such that the cell stack structure 100 does not move inside the module case 400. Here, a material having excellent thermal conductivity is used as the adhesive resin L such that heat of the battery cells 110 generated during charging and discharging is quickly dissipated to the outside through the module case 400.

Hereinafter, a structure of the battery module 10 for injecting the adhesive resin L and an injecting method will be described in detail with reference to FIGS. 3 and 9 through 11.

Figure 9:
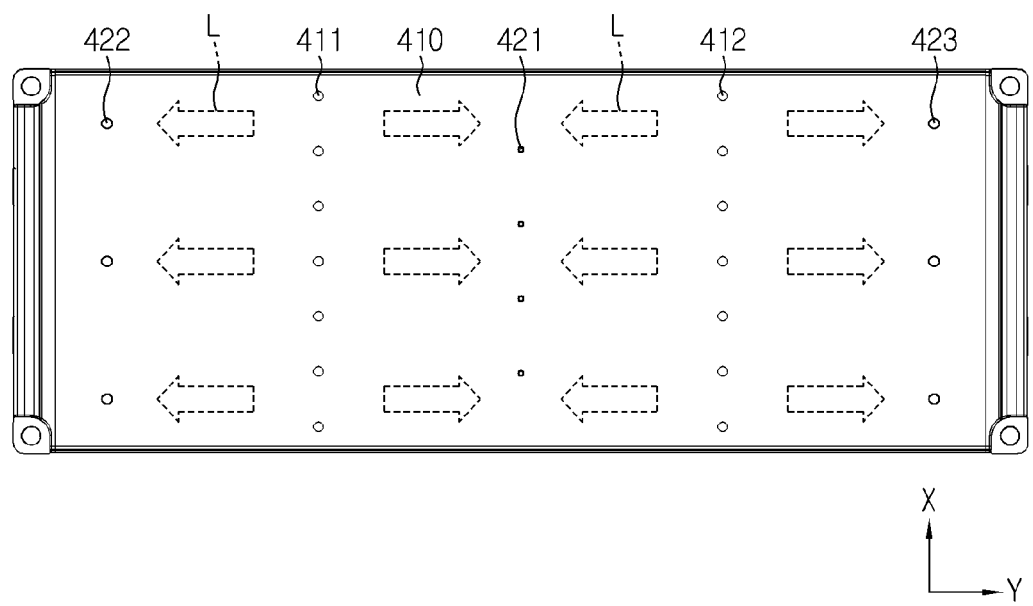
FIG. 9 is a view for describing an adhesive resin injection process according to an embodiment of the present disclosure.

As shown in FIGS. 3 and 9, the battery module 10 includes a plurality of resin injection holes 411 and 412 at a bottom surface of the module case 400. Here, a place corresponding to the bottom surface of the module case 400 where the adhesive resin L is injected is defined as a hole forming plate 410 of the module case 400.

The bottom surface of the module case 400, i.e., the hole forming plate 410, faces a bottom surface 110a of the cell stack structure 100 according to a height direction. The bottom surface of the module case 400 is the hole forming plate 410 in the current embodiment for reference, but the scope of the present disclosure is not limited thereto. In other words, a side surface or top surface of the module case 400 may be used as the hole forming plate 410.

The plurality of resin injection holes 411 and 412 are respectively distributed at a left side and a right side spaced apart from each other by a predetermined distance from a center of the hole forming plate 410 of the module case 400 in a length direction (Y-axis direction). Here, the predetermined distance may be within a range between ½ and ⅓ of a distance from the center of the hole forming plate 410 to one end.

The plurality of resin injection holes 411 and 412 of the current embodiment include first injection holes 411 arranged in one column along a width direction of the hole forming plate 410 at the left side, and second injection holes 412 arranged in one column along the width direction of the hole forming plate 410 at the right side.

In other words, the plurality of resin injection holes 411 and 412 may be provided in two columns away from each other by a predetermined distance from the center of the hole forming plate 410. Also, the first injection holes 411 and the second injection holes 412 may be provided symmetrically with respect to the center of the hole forming plate 410. In the current embodiment, seven resin injection holes 411 and 412 are provided for each column, but the number thereof may be differently determined according to the size of the width of the module case 400.

Figure 10:
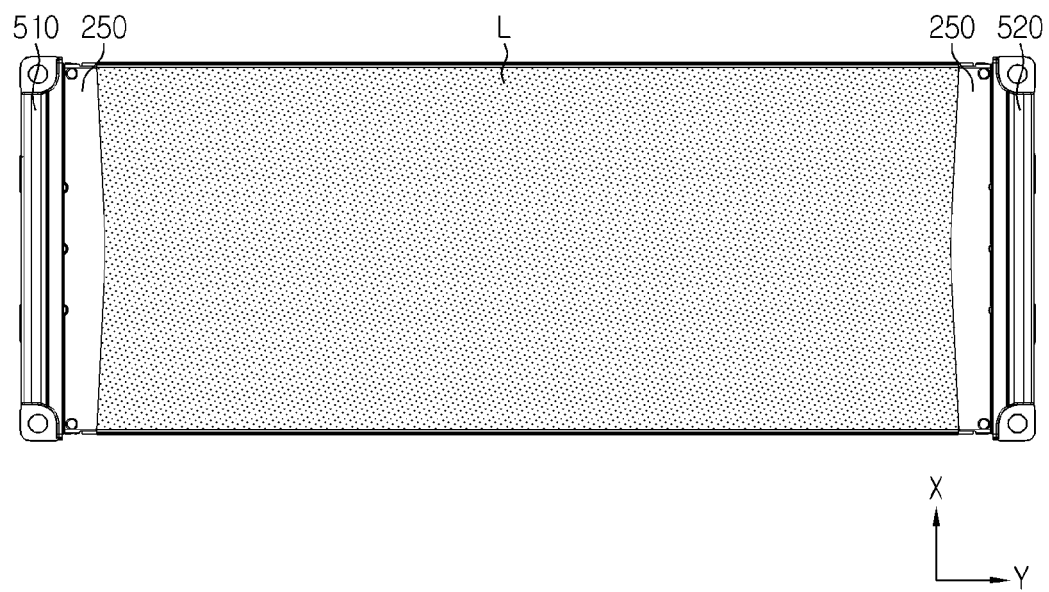
FIG. 10 is a view in which a module case is omitted from a battery module and is a view for showing a distribution of adhesive resin.

According to such a configuration, in particular, in the case of a long cell as in the current embodiment, the flow of the adhesive resin L may be induced as indicated by arrows of FIG. 9 by injecting the adhesive resin L into the first injection holes 411 and the second injection holes 412. Here, the adhesive resin L may radially spread around the first injection holes 411 and the second injection holes 412 inside the module case 400 and may be filled in the bottom surface 110a of the cell stack structure 100 and an internal space of the hole forming plate 410 as shown in FIG. 10.

Figure 1:
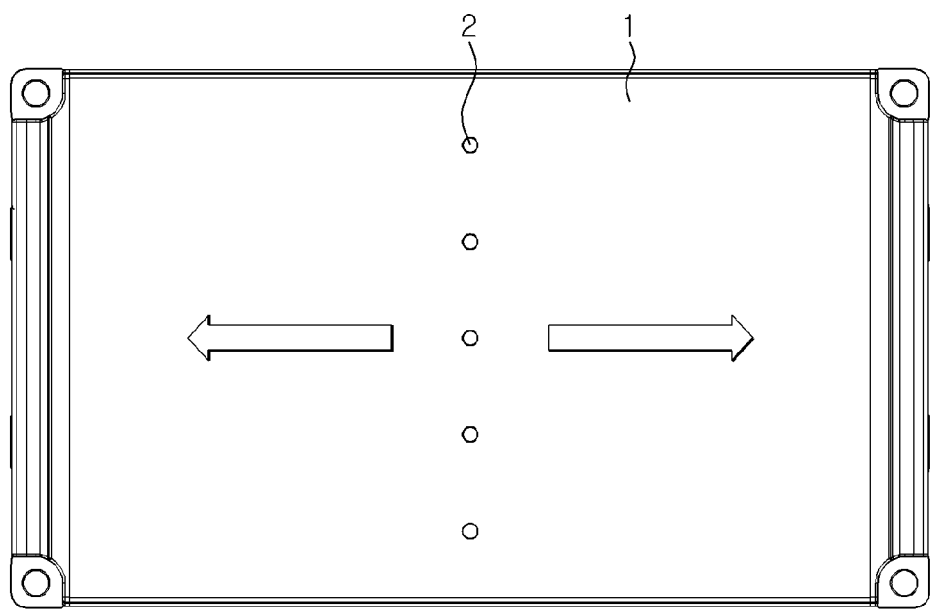
FIG. 1 is a bottom plan view of a battery module according to the related art.

For example, because the battery module 10 according to the related art (see FIG. 1) includes the injection holes 2 at the center in one column, it is difficult for the adhesive resin L to uniformly spread up to the edge, particularly when the battery cell 110 is a long cell.

On the other hand, in the current embodiment, because the resin injection holes 411 and 412 into which the adhesive resin L is injectable are provided in two columns at the left side and the right side of the center of the hole forming plate 410, the adhesive resin L injected through the first injection holes 411 may uniformly spread in a region to the left of the center of the hole forming plate 410 and the adhesive resin L injected through the second injection holes 412 may uniformly spread in a region to the right of the center of the hole forming plate 410.

Thus, according to the current embodiment, fixability and heat dissipation of the battery cells 110 may be increased because the adhesive resin L is filled between the bottom surface 110a of the cell stack structure 100 and the module case 400 without a gap.

The hole forming plate 410 of the module case 400 may further include, in addition to the resin injection holes, resin checking holes at locations spaced apart from at least one of the first injection holes 411 and the second injection holes 412 by a predetermined distance. An operator may be able to easily check whether the adhesive resin L is properly distributed up to a required place through the resin checking holes with naked eyes.

The resin checking holes of the current embodiment include first checking holes 421 provided between the first injection holes 411 and the second injection holes 412, second checking holes 422 provided at a left edge region of the hole forming plate 410, and third checking holes 423 provided at a right edge region of the hole forming plate 410.

When it is checked that the adhesive resin L injected into the first injection holes 411 and the second injection holes 412 entirely spread up to the first checking holes 421 to the third checking holes 423, it is determined that the adhesive resin L is distributed up to the required place. Thus, the trouble of performing a conventional CT scan to check the distributed state of the adhesive resin L after injecting the adhesive resin L may be reduced.

Also, the first checking holes 421 to the third checking holes 423 may be a criterion for determining an injection amount of the adhesive resin L. In other words, the injecting of the adhesive resin L is stopped when the adhesive resin L is checked from the first checking holes 421 to the third checking holes 423, and thus a proper amount of the adhesive resin L may be injected.

Meanwhile, to check only the distributed state of the adhesive resin L, an alternative may involve manufacturing the hole forming plate 410 to be entirely semi-transparent or partially semi-transparent. However, the first through third resin checking holes 421 through 423 are additionally formed by drilling the hole forming plate 410 as in the current embodiment for two purposes, i.e., checking of the distributed state of the adhesive resin L and discharging of the air.

In other words, the first through third resin checking holes 421, 422, and 423 of the current embodiment also operate as a passage allowing the air between the bottom surface 110a of the cell stack structure 100 and the module case 400 to be externally discharged during a process of injecting the adhesive resin L.

When the adhesive resin L injected into the first injection holes 411 radially spreads inside the module case 400, the surrounding air may move from side to side to be discharged to the outside of the module case 400 through the first checking holes 421 and the second checking holes 422. Similarly, when the adhesive resin L is injected into the second injection holes 412, the surrounding air may be discharged to the outside of the module case 400 through the first checking holes 421 and the third checking holes 423.

As such, because the internal air of the module case 400 is externally discharged when the adhesive resin L is injected, the adhesive resin L is filled with high density between the bottom surface 110a of the cell stack structure 100 and the module case 400, and bubbles are not generated, and thus adhesion and thermal conductivity of the adhesive resin L may be fully exhibited.

Next, shape characteristics of the resin injection holes 411 and 412 and the first through third resin checking holes 421 through 423 will be described.

There is a possibility that the adhesive resin L injected into the first injection hole 411 or the second injection hole 412 may be discharged to the outside of the module case 400 again through the first checking hole 421 through the third checking hole 423. To prevent this, the first checking holes 421 through the third checking holes 423 may be formed as small as possible, but that may not be preferable because the air flow may also deteriorate.

Figure 11:
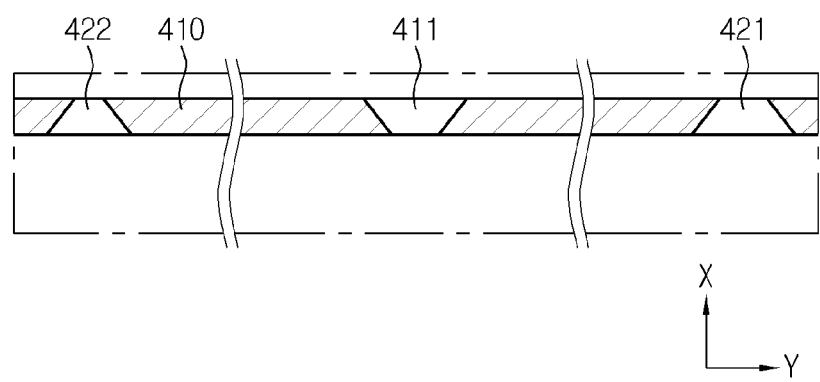
FIG. 11 is a view schematically showing a cross-sectional structure of a resin injection hole and a resin checking hole of FIG. 9.

In this regard, as shown in FIG. 11, in the current embodiment, the resin checking holes are formed such that the diameters are decreased from in inner surface to an outer surface of the hole forming plate 410 (in a thickness direction).

In this case, the air having low density is may converge well around the first through third resin checking holes 421 through 423 and be discharged to the outside, but it is difficult for the adhesive resin L having relatively very high density and viscosity to escape the first through third resin checking holes 421 through 423 having the narrow width towards the outside. In particular, this is even more so because a flow direction of the adhesive resin L crosses a hole forming direction.

On the other hand, the resin injection holes 411 and 412 may be provided in shapes opposite to the first through third resin checking holes 421 through 423. In other words, the resin injection holes 411 and 412 have diameters decreasing from the outer surface to the inner surface of the hole forming plate 410.

This is to improve the sealing force when mounting an injection nozzle by increasing a contact area of an injection nozzle (not shown) for injecting the adhesive resin L and the resin injection holes 411 and 412. In addition, when the adhesive resin L is injected, the adhesive resin L may spread quickly and far around the resin injection holes 411 and 412 because the pressure is increased as the width of an inflow portion is decreased.

Figure 12:
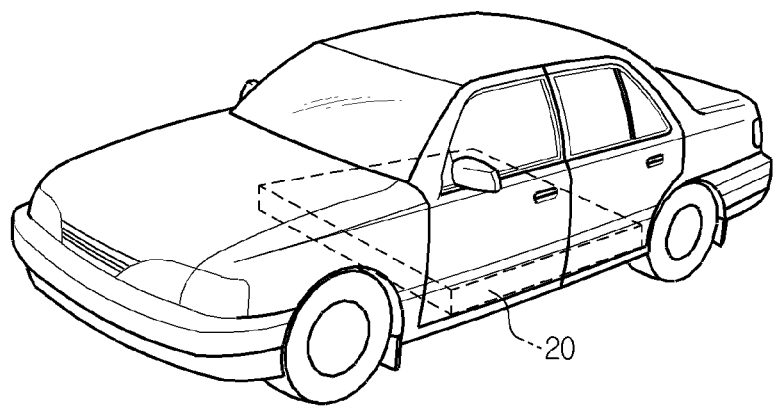
FIG. 12 is a reference view for describing a battery pack and a vehicle including the battery pack, according to an embodiment of the present disclosure.

FIG. 12 is a reference view for describing a battery pack and a vehicle including the battery pack, according to an embodiment of the present disclosure.

A battery pack 20 according to an embodiment of the present disclosure includes one or more battery modules 10 described above. The battery pack 20 may include, in addition to the battery module 10, a case (not shown) for accommodating the battery module 10 and various apparatuses (not shown) for controlling charging and discharging of the battery module 10, such as a BMS, a current sensor, a fuse, and the like.

Such a battery pack 20 is an energy source for a vehicle and may be installed in a lower space of a vehicle body as shown in FIG. 12 or in a trunk space. The vehicle includes an electric vehicle, a hybrid vehicle, or the like.

Obviously, the battery pack 20 may be applied to, in addition to vehicles, appliances and facilities using a secondary battery including an energy storage system.

Hereinabove, the present disclosure has been described with reference to limited embodiments and drawings, but the present disclosure is not limited thereto, and various modifications and changes are possible by one of ordinary skill in the art within the technical concept of the present disclosure and the equivalent scope of the claims below.

Meanwhile, the terms indicating directions, such as up, down, left, and right, are used in the present specification, but the terms are merely for convenience of description, and it would be obvious to one of ordinary skill in the art that the terms may vary according to a location of a target object or a location of an observer.

LIST OF REFERENCE NUMERALS

| | |
|---|---|
| 100: Cell stack structure | 110: Battery cell |
| 111: Electrode lead | 200: Bus bar frame assembly |
| 210: Front frame | 220: Rear frame |

-continued

LIST OF REFERENCE NUMERALS

| | |
|---|---|
| 230: Top frame | 240: Bus bar |
| 250: Support plate | 300: Voltage sensing member |
| 310: Connector member | 320: FPCB |
| 321: Sensing terminal | 400: Module case |
| 410: Hole forming plate | 411: First injection hole |
| 412: Second injection hole | 421: First checking hole |
| 422: Second checking hole | 423: Third checking hole |
| 510, 520: Module covers | |

What is claimed is:

1. A battery module comprising:
a cell stack structure including a plurality of stacked battery cells received in a module case, the module case including at least one plate having a longitudinal dimension extending between opposite left and right ends of the plate, the plate having a width dimension orthogonal to the longitudinal dimension, the plate having a central axis extending along the width dimension and centered between the left and right ends, such that the central axis is spaced apart from both the left end and the right end by a first distance, and the plate having a plurality of resin injection holes and a plurality of resin checking holes formed therein, the plurality of resin injection holes being adapted to receive adhesive resin therethrough into the module case from outside of the module case, the plurality of resin injection holes being distributed on both a left side and a right side of the central axis of the plate in the longitudinal dimension, and the plurality of resin injection holes including first injection holes arranged in a first column extending along the width dimension on the left side and second injection holes arranged in a second column extending along the width direction on the right side, wherein the plurality of resin injection holes are formed such that their diameters decrease from an outer surface to an inner surface of the plate, and the plurality of resin checking holes are formed such that their diameters decrease from the inner surface to the outer surface of the plate.

2. The battery module of claim 1, wherein the first injection holes are symmetrically positioned to the second injection holes with respect to the central axis.

3. The battery module of claim 1, wherein the plurality of resin checking holes comprise:
first checking holes provided between the first injection holes and the second injection holes; second checking holes provided at a left end region of the plate; and third checking holes provided at a right end region of the plate.

4. The battery module of claim 1, further comprising a bus bar frame assembly comprising a plurality of bus bars supporting the cell stack structure received within the module case together with the cell stack structure, the plurality of bus bars being electrically connected to electrode leads of the plurality of battery cells.

5. The battery module of claim 4, wherein a top portion, a front portion, and a rear portion of the cell stack structure are covered by the bus bar frame assembly, and a bottom portion of the cell stack structure is covered by the adhesive resin.

6. The battery module of claim 1, wherein the battery cells are each a pouch type secondary battery comprising a pair of electrode leads extending from opposite ends of the battery cells in a length dimension thereof, and wherein each of the pairs of electrode leads are formed at a location positioned downwardly from a center portion of the cell stack structure in a height direction thereof.

7. A battery pack comprising one or more battery module of claim 1.

8. A vehicle comprising the battery pack of claim 7.

9. The battery module of claim 1, wherein the longitudinal dimension of the plate is aligned along a length of the cell stack structure, and wherein a ratio of a width of the cell stack structure to the length of the cell stack structure is about 1:4 to 1:5.

10. A method of manufacturing a battery module, comprising:
injecting the adhesive resin into the plurality of resin injection holes on both the left side and the right side of the plate of the battery module of claim 1.

11. A method of manufacturing a battery module, comprising:
injecting the adhesive resin into both the first injection holes and the second injection holes of the plate of the battery module of claim 2.

12. A method of manufacturing a battery module, comprising:
injecting the adhesive resin into both the first injection holes and the second injection holes of the plate of the battery module of claim 1.

13. The method of claim 12, further comprising:
checking the resin checking holes to determine whether the adhesive resin has been distributed up to the resin checking holes.

14. A method of manufacturing a battery module, comprising:
injecting the adhesive resin into both the first injection holes and the second injection holes of the plate of the battery module of claim 3.

15. The method of claim 14, further comprising:
checking the first checking holes, the second checking holes, and the third checking holes to determine whether the adhesive resin has been distributed up to the first, second, and third checking holes, respectively.

16. A battery module comprising:
a cell stack structure including a plurality of stacked battery cells received in a module case, the module case including at least one plate having a plurality of resin injection holes and a plurality of resin checking holes formed therein, the resin injection holes being adapted to receive adhesive resin therethrough into the module case from outside of the module case, and the plurality of resin injection holes being distributed on both a left side and a right side of a center of the plate in a longitudinal direction thereof;
wherein the plurality of resin injection holes comprise first injection holes arranged in a column extending along a width direction of the plate on the left side, and second injection holes arranged in a column extending along the width direction of the plate on the right side, the first injection holes being spaced apart from the second injection holes by a predetermined distance, and the first injection holes being symmetrically positioned to the second injection holes with respect to the center of the plate;
wherein the plurality of resin checking holes are positioned at locations spaced apart from the first injection holes and the second injection holes by a second predetermined distance; and
wherein the plurality of resin injection holes are formed such that their diameters decrease from an outer surface to an inner surface of the plate, and the plurality of resin checking holes are formed such that their diameters decrease from the inner surface to the outer surface of the plate.

17. The battery module of claim 1, wherein the first column is spaced apart from the central axis by a distance in a range from one third to one half of the first distance, and the second column is spaced apart from the central axis by a distance in a range from one third to one half of the first distance.

* * * * *